United States Patent [19]

Das et al.

[11] Patent Number: 4,677,004
[45] Date of Patent: Jun. 30, 1987

[54] COLOR PLUS CLEAR COATING SYSTEM UTILIZING INORGANIC MICROPARTICLES

[75] Inventors: Suryya K. Das; Jerome A. Seiner, both of Pittsburgh; Paul P. Greigger, Allison Park; James E. Jones, Lower Burrell; Raymond F. Schappert, Glenshaw; William G. Boberski, Gibsonia, all of Pa.

[73] Assignee: PPG Industries, Inc., Pittsburgh, Pa.

[21] Appl. No.: 783,324

[22] Filed: Oct. 2, 1985

Related U.S. Application Data

[63] Continuation of Ser. No. 529,420, Sep. 6, 1983, abandoned.

[51] Int. Cl.$^4$ ............................................. B05D 3/02
[52] U.S. Cl. ................................. 427/407.1; 427/409; 427/410; 428/447
[58] Field of Search ................... 427/407.1, 409, 385.5, 427/410, 393.5; 428/447

[56] References Cited

U.S. PATENT DOCUMENTS

| | | | |
|---|---|---|---|
| 2,801,185 | 7/1957 | Iler | 106/288 |
| 2,801,186 | 7/1957 | Alexander et al. | 106/288 |
| 3,131,148 | 4/1964 | Taulli | 252/28 |
| 3,178,321 | 4/1965 | Satterfield | 148/13.1 |
| 3,547,663 | 12/1970 | Bott | 106/36 |
| 3,574,135 | 4/1971 | Sampson et al. | 253/317 |
| 3,689,300 | 9/1972 | Bunger et al. | 106/287 |
| 3,699,049 | 10/1972 | Pluta et al. | 252/309 |
| 3,855,145 | 12/1974 | Vossos | 252/309 |
| 3,948,799 | 4/1976 | Schaefer et al. | 252/309 |
| 4,238,387 | 12/1980 | Antonelli et al. | 260/42.29 |
| 4,242,396 | 12/1980 | Wilson et al. | 427/407.1 X |
| 4,284,685 | 8/1981 | Olson et al. | 427/387 X |
| 4,362,770 | 12/1982 | Mathai et al. | 427/409 |
| 4,366,185 | 12/1982 | Tanaka et al. | 427/409 X |
| 4,391,858 | 7/1983 | Batzill | 427/409 X |
| 4,403,003 | 9/1983 | Backhouse | 427/407.1 |
| 4,404,248 | 9/1983 | Spinelli et al. | 427/409 X |
| 4,411,951 | 10/1983 | Barsotti | 428/328 |
| 4,451,597 | 5/1984 | Victorius | 427/409 X |
| 4,455,331 | 6/1984 | Barsotti | 427/407.1 X |
| 4,456,647 | 6/1984 | Schönfelder et al. | 427/407.1 X |
| 4,477,517 | 10/1984 | Rummel | 428/324 |
| 4,477,536 | 10/1984 | Wright | 428/522 |
| 4,499,143 | 2/1985 | Panush | 428/336 |
| 4,536,454 | 8/1985 | Haasl | 428/516 |
| 4,544,582 | 10/1985 | Benjamin | 427/407.1 |

FOREIGN PATENT DOCUMENTS

| | | |
|---|---|---|
| 0059321 | 9/1982 | European Pat. Off. . |
| 56-141323 | 11/1981 | Japan . |
| 56-155227 | 12/1981 | Japan . |

OTHER PUBLICATIONS

Cab-O-Sil Technical Data, "Cab-O-Sil Fumed Silica for Rheology Control of High Solids Coatings", by Dennis Miller, Cabot Corporation, Oct. 1981.
Technical Service Laboratory Report, Cab-O-Sil as a Transparent Extender in Automotive Enamels, pp. 1–3, Godfrey L. Cabot, Inc., Jan. 1955.
Progress in Organic Coatings, 10(1982), pp. 91–118, "Amorphous Synthetic Silica Products in Powder Form, Part 2, Applications [1]", Horst Ferch.
"Cab-O-Sil in Coatings", pp. 4 and 11, a trade bulletin published by CABOT Corporation on or before Mar. 5, 1973.
Journal of Colloid and Interface Science, vol. 84, No. 2, pp. 409–422, (1981), "Interactions in Mixtures of Colloidal Silica Spheres and Polystyrene Molecules in Cyclohexane", De Hek et al.

*Primary Examiner*—Thurman K. Page
*Attorney, Agent, or Firm*—Thomas M. Breininger

[57] ABSTRACT

Disclosed is a method of coating a substrate comprising the steps of (A) coating the substrate with one or more applications of a basecoating composition containing (1) an organic film-forming resin, (2) substantially colorless, substantially inorganic microparticles stably dispersed in the basecoating composition, (3) a solvent system for the film-forming resin, and (4) pigment particles to form a basecoat; and (B) coating the basecoat with one or more applications of a topcoating composition containing (1) an organic film-forming resin, and (2) a solvent system for the organic film-forming resin of the topcoating composition, to form a transparent topcoat. The substantially inorganic microparticles prior to incorporation in the basecoating composition range in size from about 1 to about 150 nanometers.

20 Claims, No Drawings

COLOR PLUS CLEAR COATING SYSTEM UTILIZING INORGANIC MICROPARTICLES

This application is a continuation of application Ser. No. 529,420, filed Sept. 6, 1983 now abandoned.

BACKGROUND OF THE INVENTION

A coating system gaining wide acceptance, particularly in the automotive industry, is one which is known as "color plus clear". In this system the substrate is coated with one or more applications of a pigmented basecoating composition, which is in turn coated with one or more applications of a generally clear topcoating composition.

However, there are several difficulties in employing "color plus clear" coating systems especially as attempts are made to employ coating compositions having high solids contents and also as metallic flake pigments are used to provide a special two tone appearance to the coated substrate as it is viewed from different angles to a direction normal to the surface of the substrate. For example, it is important in a "color plus clear" coating system that the applied basecoat not be attacked by components of the topcoating composition, particularly solvents, at the interface of the two, a phenomenon often referred to as strike-in. Strike-in adversely affects the final appearance properties of the coated product. Strike-in is an especially serious problem when metallic-flake pigments are employed in the basecoating composition. Strike-in, among other things, can destroy the desired metallic-flake orientation in the basecoat.

Additionally, irrespective of the problems associated with strike-in, it is important to prevent sagging during curing of the coating composition after application to a nonhorizontal substrate. Also, especially where metallic-flake pigments are employed, it is important to achieve and maintain proper pigment orientation in the pigmented basecoating composition during the curing or drying operation. Moreover, where a material is incorporated in the topcoating composition to prevent sagging of the topcoating composition during cure, it is particularly desirable that such material not seriously affect the clarity of the cured topcoat, for example, by imparting to the topcoat a cloudy or milky appearance.

One attempt to address some of these problems has been to incorporate in the basecoating composition as part of the organic polymer system present, a proportion of organic, insoluble polymer microparticles as described for example in U.S. Pat. No. 4,220,679 to Backhouse. Another attempt to address at least some of the problems of achieving proper metallic-flake orientation in a high solids basecoat has been to substantially increase the amount of metallic-flake pigment in the basecoating composition as described in U.S. Pat. No. 4,359,504 to Troy.

It has now been found that the incorporation of substantially inorganic microparticles in the basecoating composition permits the basecoating composition to be formulated for example at high solids content and alleviates the problems of strike-in, the problems of achieving excellent metallic-pattern control where metallic-flake pigments are employed, and the problem of sagging of the coating composition on a nonhorizontal substrate during curing or drying. It has also been found that the incorporation of substantially inorganic microparticles, for example based on silica, in the topcoating composition, not only alleviates sagging of the topcoating composition during cure but also does not seriously affect the clarity of the transparent topcoat.

SUMMARY OF THE PRESENT INVENTION

The present invention provides a method for coating a substrate comprising the steps of: (A) coating the substrate with one or more applications of a basecoating composition comprising (1) an organic film-forming resin, and where the film-forming resin can be crosslinked, optionally a crosslinking agent for the film-forming resin, (2) substantially colorless, substantially inorganic microparticles stably dispersed in the basecoating composition, (3) a solvent system for the film-forming resin in which the inorganic microparticles do not dissolve, and (4) pigment particles, to form a basecoat; and (B) coating the basecoat with one or more applications of a topcoating composition comprising (1) an organic film-forming resin, which may be the same or different from the film-forming resin of the basecoating composition, and where the film-forming resin of the topcoating composition can be crosslinked, optionally a crosslinking agent for the film-forming resin of the topcoating composition, and (2) a solvent system for the organic film-forming resin of the topcoating composition, to form a transparent topcoat.

The present invention also provides a method for coating a substrate comprising the steps of: (A) coating the substrate with one or more applications of a basecoating composition comprising: (1) an organic film-forming resin, and where the film-forming resin can be crosslinked, optionally a crosslinking agent for the film-forming resin, (2) a solvent system for the film-forming resin of the basecoating composition, (3) organic polymeric microparticles which are insoluble in the solvent system of the basecoating composition and which have a diameter in the range of from about 0.01 to about 40 microns, and (4) pigment particles, to form a basecoat; and (B) coating the basecoat with one or more applications of a topcoating composition comprising: (1) an organic film-forming resin which may be the same or different from the film-forming resin of the basecoating composition, and where the film-forming resin of the topcoating composition can be crosslinked, optionally a crosslinking agent for the film-forming resin of the topcoating composition, (2) substantially colorless, substantially inorganic microparticles stably dispersed in the topcoating composition ranging in size from about 1 to about 150 nanometers, and (3) a solvent system for the organic film-forming resin of the topcoating composition to form a transparent topcoat.

DETAILED DESCRIPTION OF THE INVENTION

The film-forming resin of the basecoating composition may be any of the film-forming resins useful for coating compositions. The film-forming resins of the basecoating composition can be film-forming thermoplastic resins and/or thermosetting resins. Examples of such film-forming thermoplastic resins and/or thermosetting resins include the generally known cellulosics, acrylics, aminoplasts, urethanes, polyesters, epoxies, and polyamides. These resins, when desired, may also contain functional groups characteristic of more than one class, as for example, polyester amides, uralkyds, urethane acrylates, urethane amide acrylates, etc. As indicated above, the film-forming resin may be thermoplastic or it may be thermosetting. As used herein, the term thermosetting is intended to include not only those resins capable of being crosslinked upon application of heat but also those resins which are capable of being crosslinked without the application of heat.

Cellulosics refer to the generally known thermoplastic polymers which are derivatives of cellulose, examples of which include: nitrocellulose; organic esters and mixed esters of cellulose such as cellulose acetate, cellulose propionate, cellulose butyrate, and cellulose acetate butyrate; and organic ethers of cellulose such as ethyl cellulose.

Acrylic resins refer to the generally known addition polymers and copolymers of acrylic and methacrylic acids and their ester derivatives, acrylamide and methacrylamide, and acrylonitrile and methacrylonitrile. Examples of ester derivatives of acrylic and methacrylic acids include such alkyl acrylates and alkyl methacrylates as ethyl, methyl, propyl, butyl, hexyl, ethylhexyl and lauryl acrylates and methacrylates, as well as similar esters, having up to about 20 carbon atoms in the alkyl group. Also, hydroxyalkyl esters can readily be employed. Examples of such hydroxyalkyl esters include 2-hydroxyethyl acrylate, 2-hydroxypropyl acrylate, 2-hydroxyethyl methacrylate, 2-hydroxypropyl methacrylate, 3-hydroxypropyl-4-hydroxybutyl methacrylate, and mixtures of such esters having up to about 5 carbon atoms in the alkyl group. In some instances, corresponding esters of other unsaturated acids, for example, ethacrylic acid, crotonic acid, and other similar acids having up to about 6 carbon atoms can be employed. Where desired, various other ethylenically unsaturated monomers can be utilized in the preparation of acrylic resins examples of which include: vinyl aromatic hydrocarbons optionally bearing halo substituents such as styrene, alphamethyl styrene, vinyl toluene, alpha-chlorostyrene, alpha-bromostyrene, and para-fluorostyrene; nonaromatic monoolefinic and diolefinic hydrocarbons optionally bearing halo substituents such as isobutylene, 2,3-dimethyl-1-hexene, 1,3-butadiene, chloroethylene, chlorobutadiene and the like; and esters of organic and inorganic acids such as vinyl acetate, vinyl propionate, isopropenyl acetate, vinyl chloride, allyl chloride, vinyl alpha-chloroacetate, dimethyl maleate and the like.

The above polymerizable monomers are mentioned as representative of the $CH_2=C<$ containing monomers which may be employed; but essentially any copolymerizable monomer can be used.

Aminoplast resins refer to the generally known condensation products of an aldehyde with an amino- or amido-group containing substance examples of which include the reaction products of formaldehyde, acetaldehyde, crotonaldehyde, benzaldehyde and mixtures thereof with urea, melamine, or benzoguanimine. Preferred aminoplast resins include the etherified (i.e., alkylated) products obtained from the reaction of alcohols and formaldehyde with urea, malamine, or benzoguanimine. Examples of suitable alcohols for preparing these etherified products include: methanol, ethanol, propanol, butanol, hexanol, benzylalcohol, cyclohexanol, 3-chloropropanol, and ethoxyethanol.

Urethane resins refer to the generally known thermosetting or thermoplastic urethane resins prepared from organic polyisocyanates and organic compounds containing active hydrogen atoms as found for example in hydroxyl, and amino moieties. Some examples of urethane resins typically utilized in one-pack coating compositions include: the isocyanate-modified alkyd resins sometimes referred to as "uralkyds"; the isocyanate-modified drying oils commonly referred to as "urethane oils" which cure with a drier in the presence of oxygen in air; and isocyanate-terminated prepolymers typically prepared from an excess of one or more organic polyisocyanates and one or more polyols including, for example, simple diols, triols and higher alcohols, polyester polyols and polyether polyols. Some examples of systems based on urethane resins typically utilized as two-pack coating compositions include an organic polyisocyanate or isocyanate-terminated prepolymer (first pack) in combination with a substance (second pack) containing active hydrogen as in hydroxyl or amino groups along with a catalyst (e.g., organotin salt such as dibutyltin dilaurate or an organic amine such as triethylamine or 1,4-diazobicyclo-(2:2:2)octane). The active hydrogen-containing substance in the second pack typically is a polyester polyol, a polyether polyol, or an acrylic polyol known for use in such two-pack urethane resin systems. Many coating compositions based on urethanes (and their preparation) are described extensively in Chapter X Coatings, pages 453–607 of *Polyurethanes: Chemistry and Technology, Part II* by H. Saunders and K. C. Frisch, Interscience Publishers (N.Y., 1964).

Polyester resins are generally known and are prepared by conventional techniques utilizing polyhydric alcohols and polycarboxylic acids. Examples of suitable polyhydric alcohols include: ethylene glycol; propylene glycol; diethylene glycol; dipropylene glycol; butylene glycol; glycerol; trimethylolpropane; pentaerythritol; sorbitol; 1,6-hexanediol; 1,4-cyclohexanediol; 1,4-cyclohexanedimethanol; 1,2-bis(hydroxyethyl)cyclohexane; and 2,2-dimethyl-3-hydroxypropyl-2,2-dimethyl-3-hydroxypropionate. Examples of suitable polycarboxylic acids include: phthalic acid; isophthalic acid; terephthalic acid; trimellitic acid; tetrahydrophthalic acid; hexahydrophthalic acid; tetrachlorophthalic acid; adipic acid; azelaic acid; sebacic acid; succinic acid; maleic acid; glutaric acid; malonic acid; pimelic acid; suberic acid; 2-2-dimethylsuccinic acid; 3,3-dimethylglutaric acid; 2,2-dimethylglutaric acid; maleic acid; fumaric acid; and itaconic acid. Anhydrides of the above acids, where they exist, can also be employed and are encompassed by the term "polycarboxylic acid." In addition, certain substances which react in a manner similar to acids to form polyesters are also useful. Such substances include lactones known as caprolactone, propylolactone and methyl caprolactone, and hydroxy acids such as hydroxy caproic acid and dimethylol propionic acid. If a triol or higher hydric alcohol is used, a monocarboxylic acid, such as acetic acid and benzoic acid may be used in the preparation of the polyester resin. Moreover, polyesters are intended to include polyesters modified with fatty acids or glyceride oils of fatty acids (i.e., conventional alkyd resins). Alkyd resins typically are produced by reacting the polyhydric alcohols, polycarboxylic acids, and fatty acids derived from drying, semi-drying, and non-drying oils in various proportions in the presence of a catalyst such as litharge, sulfuric acid, or a sulfonic acid to effect esterification. Examples of suitable fatty acids include saturated and unsaturated acids such as stearic acid, oleic acid, ricinoleic acid, palmitic acid, linoleic acid, linolenic acid, licanic acid, elaeostearic acid, and clupanodonic acid.

Epoxy resins, often referred to simply as "epoxies", are generally known and refer to compounds or mixtures of compounds containing more than one 1,2-epoxy group of the formula

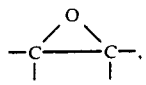

i.e., polyepoxides. The polyepoxides may be saturated or unsaturated, aliphatic, cycloaliphatic, aromatic or heterocyclic. Examples of suitable polyepoxides include the generally known polyglycidyl ethers of polyphenols and/or polyepoxides which are acrylic resins containing pendant and/or terminal 1,2-epoxy groups. Polyglycidyl ethers of polyphenols may be prepared, for example, by etherification of a polyphenol with epichlorohydrin or dichlorohydrin in the presence of an alkali. Examples of suitable polyphenols include: 1,1-bis(4-hydroxyphenyl)ethane; 2,2-bis(4-hydroxyphenyl)propane; 1,1-bis(4-hydroxyphenyl)isobutane; 2,2-bis(4-hydroxytertiarybutylphenyl)propane; bis(2-hydroxynaphthyl)methane; 1,5-dihydroxynaphthalene; 1,1-bis(4-hydroxy-3-allylphenyl)ethane; and the hydrogenated derivatives thereof. The polyglycidyl ethers of polyphenols of various molecular weights may be produced, for example, by varying the mole ratio of epichlorohydrin to polyphenol in known manner.

Epoxy resins also include the polyglycidyl ethers of mononuclear polyhydric phenols such as the polyglycidyl ethers of resorcinol, pyrogallol, hydroquinone, and pyrocatechol.

Epoxy resins also include the polyglycidyl ethers of polyhydric alcohols such as the reaction products of epichlorohydrin or dichlorohydrin with aliphatic and cycloaliphatic compounds containing from two to four hydroxyl groups including, for example, ethylene glycol, diethylene glycol, triethylene glycol, dipropylene glycol, tripropylene glycol, propane diols, butane diols, pentane diols, glycerol, 1,2,6-hexanetriol, pentaerythritol, and 2,2-bis(4-hydroxycyclohexyl)propane.

Epoxy resins additionally include polyglycidyl esters of polycarboxylic acids such as the generally known polyglycidyl esters of adipic acid, phthalic acid, and the like.

Addition polymerized resins containing epoxy groups may also be employed. These polyepoxides may be produced by the addition polymerization of epoxy functional monomers such as glycidyl acrylate, glycidyl methacrylate and allyl glycidyl ether optionally in combination with ethylenically unsaturated monomers such as styrene, alpha-methyl styrene, alpha-ethyl styrene, vinyl toluene, t-butyl styrene, acrylamide, methacrylamide, acrylonitrile, methacrylonitrile, ethacrylonitrile, ethyl methacrylate, methyl methacrylate, isopropyl methacrylate, isobutyl methacrylate, and isobornyl methacrylate.

Many additional examples of epoxy resins are described in the *Handbook of Epoxy Resins*, Henry Lee and Kris Neville, 1967, McGraw Hill Book Company.

When desired, generally known crosslinking agents may be utilized in the method of the invention particularly when thermosetting resins containing active hydrogen atoms are employed in the coating compositions.

As will be appreciated by one skilled in the art, the choice of crosslinking agent depends on various factors such as compatibility with the film-forming resin, the particular type of functional groups on the film-forming resin and the like. The crosslinking agent may be used to crosslink the film-forming resin either by condensation or addition or both. When the thermosetting reactants include monomers having complementary groups capable of entering into crosslinking reactions, the crosslinking agent may be omitted if desired.

Representative examples of crosslinking agents include blocked and/or unblocked diisocyanates, diepoxides, aminoplasts and phenoplasts. When aminoplast resins are employed as crosslinking agents, particularly suitable are the melamine-formaldehyde condensates in which a substantial proportion of the methylol groups have been etherified by reaction with a monohydric alcohol such as those set forth previously in the description of aminoplast resins suitable for use as film-forming resins in compositions of the invention.

The term "solvent system" as used herein, for example in the phrase "solvent system for the film-forming resin", is employed in a broad sense and is intended to include true solvents as well as liquid diluents for the film-forming resin which are not true solvents for the film-forming resin. The solvent system may be organic or aqueous. It may be a single compound of a mixture of compounds. When the solvent system comprises both water and an organic portion, the components are usually miscible in the proportions employed. The relationship between the solvent system and the film-forming resin depends upon the absolute and relative natures of these materials and upon the relative amounts used. Such factors as solubility, miscibility, polarity, hydrophilicity, hydrophobicity, lyophilicity and lyophobicity are some of the factors which may be considered. Illustrative of suitable components of the solvent system which may be employed are alcohols such as lower alkanols containing 1 to 8 carbon atoms including methanol, ethanol, propanol, isopropanol, butanol, sec-butyl alcohol, tertbutyl alcohol, amyl alcohol, hexyl alcohol and 2-ethylhexyl alcohol; ethers and ether alcohols such as ethylene glycol monoethyl ether, ethylene glycol monobutyl ether, ethylene glycol dibutyl ether, propylene glycol monomethyl ether, diethylene glycol monobutyl ether, diethylene glycol dibutyl ether, dipropylene glycol monoethyl ether, and dipropylene glycol monobutyl ether; ketones such as methyl ethyl ketone, methyl isobutyl ketone, methyl amyl ketone and methyl N-butyl ketone; esters such as butyl acetate, 2-ethoxyethyl acetate and 2-ethylhexyl acetate; aliphatic and alicyclic hydrocarbons such as the various petroleum naphthas and cyclohexane; aromatic hydrocarbons such as toluene and xylene; and water.

The basecoating composition also contains a pigment. Examples of opacifying pigments include titanium dioxide (rutile or anatase), zinc oxide, zirconium oxide, zinc sulfide, and lithopone. Examples of coloring pigments include iron oxides, cadmium sulfide, carbon black, phthalocyanine blue, phthalocyanine green, indanthrone blue, ultramarine blue, chromium oxide, burnt umber, benzidine yellow and toluidine red. Examples of reactive pigments include silicate-treated barium metaborate, strontium chromate and lead chromate. Examples of extender pigments include pigmentary silica, barytes, calcium carbonate, barium sulfate, talc, aluminum silicates, sodium aluminum silicates, potassium aluminum silicates and magnesium silicates. Metallic pigments include metallic powders and metallic flakes. Examples of metallic powders include aluminum powder, copper powder, bronze powder and zinc dust. Examples of metallic flakes include aluminum flakes, nickel flakes, copper flakes, bronze flakes, brass flakes and chromium flakes. A single pigment may be used or mixtures of pigments may be employed. It is preferred that at least a portion of the pigment particles be metallic flakes. The metallic flakes usually comprise aluminum flakes.

The principles respecting the formation of solutions, dispersions, pseudodispersions, and emulsions of film-forming resins are generally known in the art. Any of these systems may be utilized in the basecoating and/or topcoating composition.

In addition to the above components, the basecoating and/or the topcoating compositions employed in the invention may contain optional ingredients which may be employed in their customary amounts for their customary purposes provided they do not seriously interfere with good coatings practice. Examples of these optional ingredients include various fillers; plasticizers; antioxidants; mildewcides and fungicides; surfactants; various catalysts to promote drying or curing; resinous pigment dispersants or grinding vehicles; various flow control agents including, for example, thixotropes and additives for sag resistance and/or pigment orientation based on organic polymer microparticles (sometimes referred to as microgels) described for example in U.S. Pat. Nos. 4,025,474; 4,055,607; 4,075,141; 4,115,472; 4,147,688; 4,180,489; 4,242,384; 4,268,547; 4,220,679; and 4,290,932 the disclosures of which are hereby incorporated by reference; and other such formulating additives. In one embodiment of the present invention organic polymeric microparticles which are insoluble in the solvent system of the basecoating composition and which have a diameter in the range of from about 0.01 to about 40 microns are utilized in the basecoating composition while substantially inorganic microparticles ranging in size from about 1 nanometer (nm) to about 150 nm, preferably from about 1 nm to about 100 nm, and most preferably from about 3.5 nm to about 50 nm, and preferably comprising silica, are stably dispersed in the topcoating composition. In this embodiment, for example, where an organosol of silica particles in an alcohol such as dipropylene glycol monomethyl ether (as described infra) is incorporated in the topcoating composition, not only is sagging of the topcoating composition alleviated during heat curing, but the resulting cured topcoat has excellent clarity (i.e., transparency).

In a preferred embodiment of the method of the invention the basecoating composition contains substantially inorganic microparticles dispersed in the basecoating composition. These inorganic microparticles prior to incorporation in the basecoating composition range in diameter from about 1 to about 150 nanometers (i.e., from about 1 to about 150 millimicrons) preferably from about 1 to about 100 nanometers, and most preferably from about 3.5 to about 50 nanometers. A particularly effective type of substantially inorganic microparticles for the invention includes various silicas (especially silica sols) of particle size within the aforesaid range.

The microparticles suitable for the process of the present invention are substantially inorganic. They may or may not have been surface-treated or surface-modified with various agents to modify the compatibility of the microparticles with the film-forming resin or various solvent systems such as polar organic solvents, nonpolar organic solvents, water miscible organic solvents, water immiscible organic solvents, water and various mixtures of two or more of the above. The substantially inorganic microparticles can, for example, comprise a core of essentially a single inorganic oxide such as silica or alumina, preferably silica, or an inorganic oxide of one type coated with an inorganic oxide of another type. However the microparticles suitable for the present color plus clear coating system, particularly where utilized in the transparent topcoat, ordinarily are essentially colorless so as not to seriously interfere with the light transmissive characteristics of the coating composition when unpigmented. The substantially inorganic microparticles may be prepared in any manner capable of providing the desired particle dimensions suitable for the method of the present invention. It is to be understood that although the substantially inorganic microparticles may be discrete or associated through physical and/or chemical means into aggregates, although discrete particles are preferred, and although a given sample of the microparticles generally will have particles falling into a range of particle sizes, the substantially inorganic microparticles will have an average diameter in the range of from about 1 to about 150 nanometers. The substantially inorganic microparticles used as starting material for incorporation in the basecoating composition and optionally topcoating composition should be in a form suitable for dispersion in the coating composition whereby after dispersing, the substantially inorganic microparticles remain stably dispersed for a period of time at least sufficient so as not to prevent the use of the coating composition in the method of the invention for its intended purpose. For example, a coating composition containing dispersed inorganic microparticles, depending on the size of the inorganic microparticles and the nature of the other components employed in preparing the coating composition, in which the dispersed inorganic microparticles tend to settle over a period of time, but which can be redispersed as for example utilizing conventional paint mixing techniques, is a suitable composition for the color plus clear coating method of the invention.

A particularly desirable class of substantially inorganic microparticles for the present invention includes a wide variety of small-particle, amorphous silicas having an average particle diameter ranging from about 1 to about 150 nanometers (nm), preferably from about 1 to about 100 nm, and most preferably from about 3.5 to about 50 nm. Such silicas can be prepared by a variety of techniques in a variety of forms examples of which include but are not limited to aquasols, organosols, mixed sols and powder form. As used herein the term "mixed sols" is intended to include those dispersions of amorphous silica in which the dispersing medium comprises both an organic liquid and water. Such small particle amorphous silicas are readily available, are essentially colorless, and have refractive indices which make them suitable for combination with a variety of film-forming resins and solvent systems so as to form substantially colorless transparent coating compositions when the coating compositions are free of dyes and pigments. Moreover silicas of appropriate particle size and which have various degrees of hydrophobicity, hydrophilicity, organophobicity and organophilicity may be employed depending on compatibility with the particular film-forming resin and solvent system utilized in the method of the invention and on other factors such as the desired degree of room temperature and/or "hot room" stability of a coating composition comprising silica as substantially inorganic microparticles.

The silicas ordinarily used in the method of the invention include common amorphous forms having ultimate particles of silica which at least prior to incorporation in the basecoating and/or topcoating composition are essentially unaggregated, the surface of which silicas can contain for example anhydrous $SiO_2$ groups, SiOH groups, adsorbed organic groups, chemically bonded organic groups, various ionic groups physically associated or chemically bonded to the surface of the silica, and combinations of the above depending on the particular characteristics of the silica desired. They can be in the form of generally known organosols, mixed sols, hydrosols, pyrogenic or fumed silicas, and the like. However where high-solids, organic solvent based coating compositions are employed in the method of the invention, it is typically preferred to employ silica organosols of the types in which the particles of silica are dispersed in an alcoholic medium such as a monohydric alcohol, a polyol, or a mixture thereof and in which at least a portion of the surface of the silica particles have been modified through association with the monohydric alcohol or polyol through physical means, chemical bonding or a combination of both.

For example in one preferred embodiment of the invention the inorganic microparticles consist of silica in the form of a colloidal dispersion of the silica in an alcohol such as a lower monohydric alcohol examples of which include methanol, ethanol, n-propanol, isopropanol, n-butanol, and ether-containing alcohols such as ethylene glycol monomethyl ether, ethylene glycol monoethyl ether, diethylene glycol monomethyl ether, propylene glycol monomethyl ether, dipropylene glycol monomethyl ether, dipropylene glycol monomethyl ether, propylene glycol monobutyl ether, and dipropylene glycol monobutyl ether. Techniques for preparing such dispersions of colloidal silica in alcohols, as can be seen infra, are known. Such dispersions are often prepared by controlled addition of an aqueous silica sol to the alcohol while simultaneously removing water, for example by distillation at a temperature below that at which substantial chemical reaction between the hydroxyl groups of the alcohol and silanol groups of the colloidal silica occurs. The products are sometimes referred to as alcosols.

In another preferred embodiment, the inorganic microparticles consist of silica in the form of a colloidal dispersion of the silica in an alcohol wherein the surfaces of the silica particles have been made to have various degrees of hydrophobicity and organophilicity through chemical reaction of surface silanol moieties of the silica with an organic compound having a functional group reactive with the silanol moiety such that after reaction, the surface of the silica particles are more or less hydrophobic and the silica particles are compatible to various degrees with various organic solvents of the types commonly employed for solvent systems of organic coating compositions. For example, as further disclosed and illustrated infra, examples of the organic compound include monohydric alcohols such as ethyl alcohol, n-propyl alcohol, n-butyl alcohol, n-pentyl alcohol, n-hexyl alcohol, n-heptyl alcohol, n-octyl alcohol, n-nonyl alcohol, n-decyl alcohol, n-undecyl alcohol, lauryl alcohol, myristyl alcohol, cetyl alcohol, stearyl alcohol, isobutyl alcohol, isoamyl alcohol, 2,2,4-trimethyl hexane-1-ol, isopropyl alcohol, sec-butyl alcohol, sec-amyl alcohol, sec-n-octyl alcohol, methyl isobutyl carbinol, 2,4-dimethyl pentane-3-ol, cyclopentanol, cycloheptanol, methanol, allyl alcohol, crotyl alcohol, 2-propyn-1-ol, benzyl alcohol, 2-phenylethanol, 3-phenyl-1-propanol, and alpha-methylbenzyl alcohol. Saturated primary and secondary alcohols are preferred alcoholic reactants. Preparation of the chemical reaction products of such alcohols as those described above with the silanol moieties of the silica particles typically involves heating the silica in the presence of the alcohol to a temperature sufficient to effect esterification of the surface silanol moieties by the alcohol. The esterification temperature will depend on the relative reactivities of the hydroxyl group of the particular alcohol with the silanol moiety of the silica particle. However, ordinarily it is preferred to carry out the esterification reaction at a temperature of at least 180° C. Depending upon the particular alcohol used, compatibility with various solvent systems can be obtained. For example with long branch chain alcohols such as decyl alcohol the products are compatible with hydrocarbon solvents. Or, for example, when an aromatic substituted alcohol is used for the esterification reaction, such as benzyl alcohol, the products are compatible with aromatic hydrocarbon solvents such as benzene, toluene and xylene.

In another embodiment of the invention the substantially inorganic microparticles comprise silica prepared from the hydrolysis of a compound selected from a tetraalkylorthosilicate, an alkoxypolysiloxane, an alkylalkoxysilane or a mixture thereof in the presence of a base in a water-alcohol medium of pH greater than 7.0. Typically, tetraalkylorthosilicates selected from tetramethylorthosilicate, tetraethylorthosilicate, tetrapropylorthosilicate or a mixture thereof have been employed to prepare the silica microparticles. However, alkoxypolysiloxanes such as hexaethoxy disiloxane, octaethoxy trisiloxane, and SILBOND-40, a hydrolyzed and condensed tetraethoxysilane available from Stauffer Chemical Company, may be employed to prepare silica microparticles of suitable particle size. Examples of alkylalkoxysilanes which can be utilized to prepare the silica microparticles include hydrolyzable alkylalkoxysilanes such as octyltriethoxysilane, hexyltriethoxysilane, propyltriethoxysilane, decyltriethoxysilane, methyltriethoxysilane, dimethyldimethoxysilane, mixtures thereof, and the like. For example silica microparticles having various degrees of hydrophobicity and organophilicity can be prepared from hydrolyzing mixtures of octyltriethoxysilane and tetraethylorthosilicate in basic media wherein the amount of octyl triethoxysilane may vary from about 1 percent to about 20 percent by weight based on the sum of the weights of the octyltriethoxysilane and tetraethylorthosilicate. The compatibility of the resulting silica microparticles with solvents such as hexane and methyl amyl ketone tends to increase as the percent of octyltriethoxysilane in the reaction mixture increases.

The following description is intended to be additionally illustrative of some of the types of silica which can serve as inorganic microparticles having an average particle diameter ranging from about 1 to about 150 nm, preferably from about 1 to about 100 nm, and most preferably from about 3.5 to about 50 nm, for the preparation of compositions useful in the method of the invention. The preparation and properties of these silicas are generally known. The silica particles generally may have a surface area ranging from about 20 to about 3000 square meters per gram ($m^2/g$), preferably from about 30 to about 3000 $m^2/g$, and most preferably from about 60 to about 850 $m^2/g$ and prior to incorporation into the coating composition may be in the form of dense, discrete ultimate particles or aggregates of associated particles, although silicas having discrete ultimate particles are preferred. In either case, the average diameter of the particles of silica (taken as approximate spheres) will fall within the ranges previously set forth.

One common method for making silicas having an average particle size ranging from about 1 to about 150 nm employs preparation of the silica in an aqueous medium to produce a hydrosol of silica. Silica hydrosols may be prepared for example by partially neutralizing an aqueous solution of an alkali metal silicate, ordinarily sodium silicate, with acid to a pH typically of about 8 to about 9 such that the resulting sodium content of the solution ordinarily is less than about 1 percent by weight based on sodium oxide. A somewhat different, less common approach involves reacting the aqueous sodium silicate solution with sufficient acid to make an acidic sol and precipitating the sodium salt in a strongly acidic medium. This alternate approach makes use of the property that polysilic acid is temporarily stable at about a pH of 2, and if the sodium salt of the acid used for neutralizing the sodium silicate is sufficiently insoluble, it can be precipitated and separated. Once the salt is separated from the acidic sol, the sol can be alkalinized to grow colloidal particles and stabilize the product or can be employed in other known processes of growing silica particles to the desired size. Typically a heating step is involved in these processes since temperature is a well known variable for controlling the particle size of the silica product. Representative preparations of silica aquasols are contained in the following literature which is hereby incorporated by reference: U.S. Pat. Nos. 2,244,325; 2,375,738; 2,574,902; 2,577,484; 2,577,485; 2,750,345; 3,012,973; 3,440,174; 3,538,015; 3,673,104; 3,714,064 and THE CHEMISTRY OF SILICA by Ralph K. Iler, copyright 1979, pages 172-176 and 331-343. Aquasols of silica may be utilized in the method of the invention for example where water-based coating compositions are employed. They also can be used for example as starting materials for the preparation of organosols.

A method for preparing silica sols having uniform spherical silica particles of controlled particle size by hydrolyzing a lower alkoxysilane in an alcohol medium containing suitable amounts of water and ammonia has been described by Stöber et al in the JOURNAL OF COLLOID AND INTERFACE SCIENCE, Volume 26, pages 62-69 (1968) the disclosure of which is hereby incorporated by reference.

Silica organosols are especially preferred in the method of the present invention where organic solvent based coating compositions are employed. The silanol (SiOH) surface of silica particles which have not been modified utilizing various organic compounds tends to limit their dispersibility in organic media to organic liquids such as lower alcohols, amides and ketones. However silicas containing surface modification by various organic compounds can be dispersed to form organosols in a variety of organic liquids. Such surface modification may be in the form of treatment of the silica with organic ions such as quaternary ammonium ions like tetramethylammonium ions, quaternary ammonium ions containing long-chain hydrocarbon groups and by treating with an organic amine or quaternary ammonium compound in the presence of a water-immiscible organic liquid as described for example in U.S. Pat. Nos. 2,601,352; 2,692,863 and 3,629,139 and THE CHEMISTRY OF SILICA by Ralph K. Iler, copyright 1979, pages 359 and 360. Organic anions can be attached to the silica surface through metal cations as described for example in U.S. Pat. No. 3,625,856. Surface modification of the silica particles can be effected by treatment with various organic compounds which can associate with the surface of the silica either through physical means and/or chemical means as for example by treatment with monohydric alcohols, polyols, and mixtures thereof, optionally under conditions of time and temperature such that silanol groups of the silica particles are esterified by reaction with hydroxyl groups of the monohydric alcohols and/or polyols. Still another way to modify the surface of a silica particle to render it more organophilic is to react the surface of the silica with alkyl chlorosilanes to attach organosilyl groups. In short, a variety of ways are well known in the art for modifying the surface of silica to make the silica more compatible with organic liquids. Representative preparations of silica organosols and mixed sols can be found in the following literature which is hereby incorporated by reference: U.S. Pat. Nos. 2,375,738; 2,577,485; 2,801,185; 2,801,186; 3,108,970; 2,692,863; 3,629,139; 3,660,301; 2,601,352; 3,625,856; 2,921,913; 2,739,078; 3,699,049; 2,974,105; 3,351,561; 3,336,235; 3,855,145; 2,786,042; and THE CHEMISTRY OF SILICA by Ralph K. Iler, copyright 1979, pages 412–415.

Silicas in powder form represent another, although less preferred, type of silica which may be utilized as the substantially inorganic microparticles in the method of the invention. Silica powders may be prepared for example from crushing a silica gel or from generally known flame hydrolysis techniques which result in what are often referred to as fumed silias or pyrogenic silicas. Silica powders generally are in a form in which the particles consist of small granules of pulverized silica gel or of coherent aggregates of submicron particles that are linked together in networks. As disclosed by R. K. Iler in THE CHEMISTRY OF SILICA, copyright 1979 at page 462, 476 and 477, a silica powder might consist of separate discrete silica particles, but when the particle diameter is less than 100 nm, the particles spontaneously adhere into loose aggregates. In powders the ultimate (or primary) particles are aggregated into what have been called "secondary particles", "clusters" or "aggregate particles" all of which are referred to herein simply as aggregates. Various types of silica powders are known in which the nature of the surfaces of the silica particles vary from one type of powder to another. For example, in some powders the surface of the particles are essentially fully hydroxylated, i.e., the surface structure terminates in silanol (SiOH) groups. Powders of the fully hydroxylated type tend to be readily wettable by water and water-miscible organic molecules. In some powders, the surface of the particles can be considered to be made up of siloxane

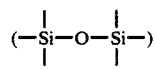

bonds which present primarily oxygen atoms at the surface. In these powders, usually only a small fraction of silanol groups are present. Pyrogenic silicas condensed from the vapor state as well as hydroxylated silicas which have been dehydrated at high temperatures, e.g., about 1000° C., tend to be of this type. Moreover, the surfaces of silica powders can be modified by chemical or physical attachment of organic molecules or radicals which modification can impart various degrees of hydrophobicity, organophilicity, hydrophilicity, or oleophobicity to the silica particles.

The silicas in powder form, for reasons which are not entirely understood, tend to perform somewhat less effectively in the method of the invention. When employed in the basecoating composition for example they typically require a disadvantageous amount of grinding which typically is done as pregrinding in a solvent. Moreover, when employed in the topcoating composition, the dried or cured film often does not exhibit as high a degree of gloss as is desired for certain applications such as topcoats for automobiles. The differences in behavior of the powder forms of silica compared to for example silicas in the form of organosols, is believed to be at least in part a result of a high proportion of particles in the form of aggregates being present in the powder forms. Moreover, when utilized in a basecoating composition containing metallic pigment, typically a larger amount of a powder form of silica is needed to provide a desired degree of metallic pattern control as compared to utilization of a silica in the form of a sol having a high proportion of discrete ultimate particles.

A wide variety of silicas in the form of hydrosols, organosols and powders may be obtained for example under the trade names of LUDOX from E. I. Du Pont De Nemours and Company, NALCOAG from Nalco Chemical Company, NYACOL from Nyacol, Inc., SNOWTEX from Nissan Chemical Industries, Ltd., CAB-O-SIL from Cabot Corp. and AEROSIL from Degussa Inc.

The basecoating composition and topcoating compositions are usually prepared by simply admixing the various ingredients for the respective compositions at room temperature although elevated temperatures may be used.

The amounts of the materials in the basecoating composition including the substantially inorganic microparticles can vary widely. Generally the film-forming resin constitutes from about 10 percent to about 95 percent by weight, typically from about 25 percent to about 50 percent by weight, of the basecoating composition. Generally the amount of substantially inorganic microparticles can range from about 1 percent to about 30 percent by weight, typically from about 10 percent to about 20 percent by weight, based on the sum of the weights of the organic film-forming resin, optional crosslinking agent, and inorganic microparticles.

The amount of solvents and/or diluents constituting the solvent system for the film-forming resin also may vary widely. Generally the total amount of solvents and/or diluents may range from about 0 to about 80 percent by weight, typically from about 35 to about 65 percent by weight, of the basecoating composition.

The amounts of pigment particles present in the basecoating composition is likewise subject to wide variation. Generally the pigment is present in an amount ranging from about 2 to about 50 percent by weight, typically from about 3 to about 30 percent by weight, based on the sum of the weights of the film-forming resin and the substantially inorganic microparticles. When metallic flakes are employed as pigment on the basecoating composition, they generally are present in the range of from about 2 to about 30 percent by weight, typically from about 10 to about 20 percent by weight, based on the sum of the weights of the film-forming resin and the substantially inorganic microparticles present in the basecoating composition.

The film-forming resin of the topcoating composition can be any of the film-forming resins useful for coating compositions and can be the same or different from the film-forming resin of the basecoating composition. Likewise, film-forming resins for the topcoating composition can be film-forming thermoplastic resins and/or thermosetting resins. Illustrative examples of film-forming resins suitable for the topcoating composition have been described previously in the discussion of examples of film-forming resins suitable for the basecoating composition. The solvent systems described with respect to the basecoating composition also can be employed for the film-forming resin of the topcoating composition. For example, the film-forming resin of the topcoating composition may be dissolved in the solvent system or it may be dispersed in the solvent system. Like the solvent system for the film-forming resin of the basecoating composition, the solvent system for the topcoating composition may be organic or aqueous and may be a single compound or a mixture of compounds. Illustrative of components suitable for the solvent system include those described previously.

As for the film-forming resin of the basecoating composition the film-forming resin of the topcoating composition may be present in the coating composition in the form of a solution, dispersion, emulsion or pseudo-dispersion. Likewise, the topcoating composition may contain optional ingredients such as various fillers, plasticizers, antioxidants, mildewcides and fungicides, surfactants, various catalysts to promote drying or curing, and various flow control agents as described previously with respect to the basecoating composition.

Where a crosslinkable film-forming resin is utilized in the topcoating composition, optionally a crosslinking agent can be incorporated in the topcoating composition. Examples of such crosslinking agents include those described previously with respect to the basecoating composition.

The topcoating composition is formulated so that when it is applied to the basecoat, it forms a clear topcoat so that the pigmentation of the basecoat will be visible through the topcoat. It should be understood that the topcoat, while being transparent, may contain small amounts of dyes and/or tints to modify the overall appearance where desired. However, it is usually preferable not to employ even small amounts of dyes and/or tints in the topcoating composition. Although the topcoating composition may contain transparent extender pigments and optionally a small amount of coloring pigment, it should not contain so much coloring pigment that it interferes with the general transparency of the topcoat. Usually it is preferable not to utilize even small amounts of coloring pigment in the topcoating composition.

The amounts of the film-forming resin, solvent system, and optionally inorganic microparticles, employed in the topcoating composition generally are as described with respect to the amounts of these components for the basecoating composition. However, when inorganic microparticles are incorporated in the topcoating composition for example to control sagging, the level of inorganic microparticles so utilized is typically less than the level of inorganic microparticles when used in the basecoating composition to control pigment orientation. Generally the amount of substantially inorganic microparticles in the topcoating composition can range from about 1 percent to about 20 percent by weight, typically from about 2 percent to about 12 percent by weight, based on the sum of the weights of the organic film-forming resin, optional crosslinking agent, and inorganic microparticles.

The method of the invention can be employed utilizing a wide variety of substrates such as metals, wood, glass, cloth, plastics, fiberglass, foams and the like as well as over primers. The basecoating composition and topcoating composition can be applied to the substrate using any application technique known in the art such as roll coating, curtain coating, dip coating, doctor blade coating, spraying and the like although spraying is most often employed.

In the method of the invention the basecoating composition containing organic film-forming resin, the solvent system for the film-forming resin, pigment particles, and dispersed inorganic microparticles, is first applied to the substrate. The basecoating composition, depending on the choice of thermoplastic and/or thermosetting resin, may be dried or cured at ambient temperature or with applied heat to a degree at least sufficient to allow the clear topcoating composition to be applied to the basecoat without undesirable strike-in. Thermoplastic coating compositions are typically hardened by evaporation of the volatile solvent system. Thermosetting coating compositions can be cured in a variety of ways, typically at temperatures in the range of from about 20° C. to about 260° C. Some of the thermosetting film-forming resins such as air-curable alkyds for example may be cured by exposure to the oxygen in air. Many of the coating compositions contain a crosslinking agent. When a crosslinking agent is present, the coating compositions are usually cured by the application of heat. Although a curing temperature may vary widely it is typically in the range of about 80° Celsius (C.) to about 150° C. Similarly, curing times may be subject to wide variation, but typically range from about 10 minutes to about 45 minutes. Where a plurality of superimposed basecoats or topcoats are to be applied, each coating composition may be cured prior to application of the next coating composition. It is preferable, however, to utilize coating systems which will permit the application of two or more superimposed coatings which can be cured together in a single curing operation. For example, a thermosetting basecoat may be cured prior to application of a thermosetting topcoat, although it is preferred to use coating systems which will permit the topcoating composition to be applied to a substantially uncured basecoat and to cure them simultaneously in one operation. Particularly when heat curing is employed, it is sometimes desirable to allow the basecoating composition to flash at ambient temperature for up to about 30 minutes, typically up to about 5 minutes, before the topcoating composition is applied to the basecoat. Such solvent flashing may be utilized with either basecoating compositions containing thermoplastic film-forming resins or with basecoating compositions containing thermosetting film-forming resins (i.e., those which involve some degree of crosslinking during cure).

The color plus clear method of the invention provides a number of advantages. By incorporating the inorganic microparticles in the pigmented basecoating composition and optionally in the topcoating composition, the amount of sagging of the coating compositions on a verticle substrate during heating can be substantially reduced or even eliminated often without the use of known organic microgels. Moreover, this advantage with respect to sag control is especially important when a high-solids coating composition is utilized in the method of the invention where sag control can be an especially serious problem. As used herein, the term "high solids coating composition" is intended to include those coating compositions having a total solids content of at least about 50 percent by weight, preferably at least about 60 percent by weight, based on the total weight of the coating composition and which can be applied to the substrate by conventional spraying techniques. Moreover, it is preferred that the basecoating and topcoating compositions be applied by conventional spraying to the substrate at a combined total solids content of at least 50 percent by weight of the sum of the basecoating composition and the topcoating composition. The solids are understood to include the essentially nonvolatile components of the coating composition including, for example, film-forming resin, inorganic microparticles and pigment particles. It is to be understood that the optiional crosslinking agents, examples of which have been described above, are intended to be included for the purpose of the determination of the solids content of the coating composition. Particularly where a high-solids coating composition is utilized in the method of the invention, typically the organic film-forming resin will comprise a crosslinkable resin having a weight average molecular weight of from about 500 to about 10,000 and typically and coating composition will contain a crosslinking agent examples of which include those described previously.

Additionally, when the inorganic microparticles are incorporated in the topcoating composition, the topcoating composition surprisingly can be cured to a high gloss film without the occurrence of substantial flattening effects (i.e., substantial gloss reduction) which certain particulate silicas which have previously been used in coating compositions provide. This is important for example where high gloss coatings are desired as in automotive coatings applications. Equally important, where metallic flakes are employed as pigment in the basecoating composition, the incorporation of the inorganic microparticles provides excellent control of the pigment orientation in the basecoat such that the dried or cured coating exhibits a high degree of pattern control as evidenced by excellent two tone appearance when viewed at different angles to a direction normal to the coated surface and excellent metallic brightness (sometimes referred to as brightness of face or lightness of face) when viewed from a direction essentially normal to the coated substrate. Moreover, this high degree of pattern control may be achieved in the method of the invention without the necessity of using known organic polymer microgels which have been synthesized for this purpose, although it is to be understood that the scope of the present invention is intended to include the color plus clear coating method of the invention wherein an organic polymer microgel is employed in combination with the inorganic microparticles in the basecoating composition and/or topcoating composition.

Some further advantages of the method of the invention may obtain because of the nature of the inorganic microparticles. Being substantially inorganic, the microparticles are inherently more resistant to degradation from the action of ultraviolet light as from exposure to sunlight, from hydrolysis, and from extreme conditions such as high temperatures and salt spray. Moreover, the inorganic microparticles are not subject to internal attack by organic solvents and do not swell in the presence of organic solents.

The following examples are intended to further illustrate the present invention. As used in the body of the specification, examples and claims, all percents, ratios and parts are by weight unless otherwise specifically indicated. As used herein, "pbw" means "parts by weight."

EXAMPLE 1

This example illustrates the preparation of a colloidal silica in dipropyleneglycol monomethylether.

A 12 liter flask is equipped for vacuum distillation, the apparatus including a mechanical stirrer, heating mantle, addition funnel, pot thermometer, and vacuum take-off head containing a thermometer and a condenser.

The flask is charged with 5600 g of dipropyleneglycol monomethylether (DOWANOL DPM from Dow Chemical Company).

To the contents of the flask is added 6118 g of aqueous colloidal silica (NALCOAG 1034A, having a silica solids content of 35.3% by weight and a pH of about 3). Distillate containing water is removed under a vacuum of 45 torr while the temperature of the contents of the flask rises from 44° C. to 95° C. during which time essentially all of the water in the flask is distilled off. The resulting dispersion of colloidal silica in dipropyleneglycol monomethylether has a content of silica solids of 30.8% by weight, a residual water content of 0.27% by weight, and a low viscosity (12.4 seconds, No. 4 Ford Cup).

EXAMPLE 2

A 50% solids dispersion of silica in dipropyleneglycol monomethylether is prepared by a process similar to that described in EXAMPLE 1. A 3 liter flask is equipped for vacuum distillation as described in EXAMPLE 1. The flask is charged with 1050 g of dipropyleneglycol monomethylether (DOWANOL DPM from Dow Chemical Company).

To the contents of the flask is added 2578.8 g of aqueous colloidal silica (NALCOAG 1034A having a silica solids content of 34.9% by weight and a pH of about 3). The addition of the aqueous colloidal silica is done slowly and the pot temperature is maintained at about 45°-50° C. by the addition of the aqueous silica. During the addition, distillate containing water is removed under a vacuum of 45 torr while the temperature of the contents of the flask rises from 42° C. to 100° C. during which time essentially all of the water in the flask is distilled off. The resulting dispersion of colloidal silica in dipropyleneglycol monomethylether has a content of silica solids of 50.8% by weight, a residual water content of 0.08% by weight and a viscosity of 18 seconds through a No. 4 Ford Cup.

EXAMPLE 3

A dispersion of colloidal silica in dipropyleneglycol monomethylether which is essentially free of water and which has a silica solids content of 32 percent by weight is prepared according to the procedure described in EXAMPLE 1.

A 5 liter flask equipped for distillation is charged with 2812.5 grams of the dispersion of colloidal silica (32 percent by weight silica solids) and 600 grams of n-decyl alcohol. The contents of the flask are heated and held at reflux under atmospheric pressure for about 2 hours during which time the temperature of the contents of the flask gradually rises to 207° C. and 1931 grams of distillate is removed. The resulting product is a colloidal silica having n-decyloxy groups bound to the silica surface. To the resulting product is added 1900 grams of methylamyl ketone to reduce the silica solids content of the flask to 26.6 percent by weight.

EXAMPLE 4

A grinding apparatus consisting of a ball mill jar rotated by a pair of rollers and containing solid, ceramic, Burundum cylinders that range in length from about ½ to about ¾ inch in length and from about ⅜ to about ¾ inch in diameter is charged with 60 grams of a fumed silica having a surface area of approximately 200 square meters per gram (available as CAB-O-SIL PTG from Cabot Corporation) and 340 grams of propyleneglycol monomethylether (DOWANOL PM). The fumed silica is ground in the propyleneglycol monomethylether for 64 hours. The resulting composition has a silica solids content of 16.0 percent by weight (as determined as 250° F. for 2 hours) and gives a Hegman grind reading of 8+.

EXAMPLE 5

An amount of 225 grams of fumed silica having a surface area of about 120 $m^2/g$ (available as AEROSIL R972 from Degussa, Inc.) is ground for 64 hours in 1275 grams of propyleneglycol monomethylether (DOWANOL PM) according to the procedure described in EXAMPLE 4. The resulting composition has a silica solids content of 15.9 percent by weight and gives a Hegman grind reading of 8+.

EXAMPLE 6

A 1 liter flask is equipped for vacuum distillation as described in EXAMPLE 1 and is charged with 460 g of dipropyleneglycol monomethylether (DOWANOL DPM).

An aqueous dispersion of colloidal silica having a silica solids content of 50 percent by weight and an average silica particle size of greater than 700 Angstroms (NALCOAG 5SJ-626) is treated with a strong acid ion exchange resin (Amberlite 200 from Rohm and Haas Company) until the pH is lowered to 2.5.

The aqueous dispersion of colloidal silica having a pH of 2.5 is added to the 1 liter flask containing the dipropyleneglycol monomethylether while water is distilled off under a vacuum of 40 torr. The vacuum distillation is continued until the pot temperature reaches 110° C. and the vapor temperature (head temperature) reaches 90° C. The total amount of distillate recovered is 574 g. The resulting dispersion of colloidal silica in dipropyleneglycol monomethylether has a silica solids content of 44.3 percent by weight.

EXAMPLE 7

A 1 liter flask is equipped for vacuum distillation as described in EXAMPLE 1.

An aqueous colloidal silica having a silica solids content of 15 percent by weight and an average silica particle size of 40 Angstroms, A° (NALCOAG 1115) is treated with a strong acid ion exchange resin in the acid form (Amberlite 200 from Rohm and Haas Company) until the pH of the aqueous colloidal silica is lowered to 3.0. Next this acidified colloidal silica is treated with a strongly basic ion exchange resin which is in the hydroxide form (Amberlite IRA-900 from Rohm and Haas Company) until the pH is raised to 5. Thereafter, this colloidal silica is further contacted with Amberlite 200 until the pH is lowered to 2.8. These multiple ion exchange steps are similar to those described in U.S. Pat. No. 3,855,145.

Next, 630 g of the ion exchanged, aqueous colloidal silica having a pH of 2.8 is added slowly to the 1 liter flask which contains 630 g of dipropyleneglycol monomethylether (DOWANOL DPM). The pot temperature is maintained at 45°-50° C. during the addition of the ion exchanged, aqueous colloidal silica to the dipropyleneglycol monomethylether. Thereafter, water is distilled off under a vacuum of 40 torr while the pot temperature rises to 71° C. and the vapor temperature (head temperature) rises to 54° C. A total of 586 g of distillate is recovered. The resulting dispersion of colloidal silica in dipropyleneglycol monomethylether has a silica solids content of 12.8 percent by weight and a residual water content of 1.08 percent by weight.

EXAMPLE 8

A 5 liter, 4-neck flask is equipped with a stirrer, thermometer, condenser, and distillation take-off.

In the 5 liter flask are mixed 2402 g of methanol, 460 g of distilled water, and 156.1 g of an aqueous solution containing 30 percent by weight ammonia. The resulting solution is heated to reflux and when the concentration of ammonia in the solution is 0.65 molar, 532 g of ethylsilicate, condensed, from Union Carbide Corporation (believed to contain about 90 percent by weight tetraethylorthosilicate and about 10 percent by weight of hexaethoxydisiloxane) is added to the contents of the flask all at once with vigorous stirring. The contents of the flask turns milky 4 minutes after the addition of the ethylsilicate, condensed, to the flask.

Next, the contents of the flask are refluxed for two hours and thereafter allowed to cool to room temperature.

Next, 1695 g of a distillate containing methanol and ammonia is removed from the flask by vacuum distillation at 90 torr and 32° C.

The dispersion remaining in the flask is then acidified from a pH of 8.44 to a pH of 2.40 by the addition of 8 milliliters (ml) of concentrated hydrochloric acid (12 Molar). To the acidified colloidal dispersion is added 1200 ml of 1-methoxy-2-propanol (DOWANOL PM from DOW Chemical Company).

Next, essentially all of the remaining methanol and water in addition to some of the 1-methoxy-2-propanol are removed by azeotropic distillation at a pressure of 45 torr. Thereafter, further concentration of the colloidal dispersion by vacuum distillation at 45 torr and 62° C. results in a stable dispersion of colloidal silica in 1-methoxy2-propanol having a silica solids content of 24.2 percent by weight. During the aforesaid azeotropic distillation and further concentration at 45 mm torr, a total of 1994.5 g of distillate is removed from the flask.

EXAMPLE 9

A 5 liter, 4-neck flask equipped with a stirrer, thermometer, and distillation take-off is charged with 2039 grams of methanol, 220 grams of distilled water, and 216.6 grams of an aqueous solution containing 30 percent by weight ammonia. The resulting solution is heated to reflux and when the concentration of ammonia in the solution is 0.71 molar, a mixture of 504.7 grams of ethyl, silicate, condensed, from Union Carbide Corporation (believed to contain about 90 percent by weight tetraethylorthosilicate and about 10 percent by weight of hexaethoxydisiloxane) and 21.0 grams of octyltriethoxysilane is added all at once with vigorous stirring.

Next, the contents of the flask are refluxed for two hours and thereafter allowed to cool to room temperature.

Next, 1045 grams of a distillate containing methanol and ammonia is removed from the flask by vacuum distillation at 50 torr pressure and 23° C.

Next, 300 milliliters of 1-methoxy-2-propanol (DOWANOL PM from DOW Chemical Company) is added to the contents of the flask and the dispersion is thereafter acidified from a pH of 8.9 to a pH of 2.26 by the addition of 10 ml of concentrated hydrochloric acid (12 Molar). To the acidified colloidal dispersion is added 1000 ml of 1-methoxy-2-propanol (DOWANOL PM).

Next, essentially all of the remaining methanol and water in addition to some of the 1-methoxy-2-propanol are removed by azeotropic distillation at a pressure of 45 torr and a temperature of 59° C. During the aforesaid azeotropic distillation a total of 2425 g of distillate is removed from the flask. The resulting product is a stable dispersion of colloidal silica in 1-methoxy-2-propanol having a silica solids content of 19.7 percent by weight.

EXAMPLE 10

The following Examples 10A through 10I illustrate the method of the present invention utilizing coating compositions prepared from the dispersions of colloidal silica of EXAMPLES 1 through 9. Example 10J is a comparison example.

High-solids, metallic basecoating compositions are prepared by mixing under agitation the ingredients in the amounts in parts by weight set forth in the following TABLE 1.

TABLE 1

| Composition | 10A | 10B | 10C | 10D | 10E | 10F | 10G | 10H | 10I | 10J |
|---|---|---|---|---|---|---|---|---|---|---|
| Ultraviolet light absorber[1] | 3.0 | — | — | — | — | — | — | — | — | — |
| Methylamyl ketone | 11.6 | 36.5 | — | — | — | — | — | — | — | 47.5 |
| Colloidal silica dispersion[2] | 65.6 | — | — | — | — | — | — | — | — | — |
| Colloidal silica dispersion[3] | — | 41.2 | — | — | — | — | — | — | — | — |
| Colloidal silica dispersion[4] | — | — | 78.9 | — | — | — | — | — | — | — |
| Colloidal silica dispersion[5] | — | — | — | 140.6 | — | — | — | — | — | — |
| Colloidal silica dispersion[6] | — | — | — | — | 188.7 | — | — | — | — | — |
| Colloidal silica dispersion[7] | — | — | — | — | — | 152.4 | — | — | — | — |
| Colloidal silica dispersion[8] | — | — | — | — | — | — | 82.0 | — | — | — |
| Colloidal silica dispersion[9] | — | — | — | — | — | — | — | 80.6 | — | — |
| Colloidal silica dispersion[10] | — | — | — | — | — | — | — | — | 98.5 | — |
| Acrylic resin[11] | 43.26 | 70.1 | 43.26 | 70.06 | 60.1 | 10.1 | 86.1 | 74.06 | 74.1 | 100.0 |
| Crosslinking agent[12] | 75.0 | 75.0 | 75.0 | 75.0 | 75.0 | 75.0 | 75.0 | 75.0 | 75.0 | 75.0 |
| Methanol | 9.0 | 9.0 | 9.0 | 9.0 | 9.0 | 9.0 | 9.0 | 9.0 | 9.0 | 9.0 |

TABLE 1-continued

| Composition | 10A | 10B | 10C | 10D | 10E | 10F | 10G | 10H | 10I | 10J |
|---|---|---|---|---|---|---|---|---|---|---|
| Blue pigment paste[13] | 86.4 | — | 86.4 | — | — | — | — | — | — | — |
| Aluminum pigment paste[14] | — | 31.6 | — | 31.6 | 31.6 | 31.6 | 31.6 | 31.6 | 31.6 | 31.6 |
| Catalyst composition[15] | 3.8 | 3.8 | 3.8 | 3.8 | 3.8 | 3.8 | 3.8 | 3.8 | 3.8 | 3.8 |

[1] A derivative of hydroxyphenyl benzotriazole available as TINUVIN 328 from Geigy Industrial Chemicals.
[2] A dispersion of colloidal silica in dipropylene glycol monomethylether prepared in the manner described in EXAMPLE 1 but having a silica solids content of 32.0 percent by weight.
[3] The dispersion of colloidal silica in dipropyleneglycol monomethylether as described in Example 2.
[4] The dispersion of colloidal silica in dipropyleneglycol monomethylether as described in Example 3.
[5] The dispersion of colloidal silica in propyleneglycol monoemethylether as described in Example 4.
[6] The dispersion of colloidal silica in propyleneglycol monomethylether as described in Example 5.
[7] The dispersion of colloidal silica in dipropyleneglycol monomethylether as described in Example 6.
[8] The dispersion of colloidal silica in dipropyleneglycol monomethylether as described in Example 7.
[9] The dispersion of colloidal silica in 1-methoxy-2-propanol as described in Example 8.
[10] The dispersion of colloidal silica in 1-methoxy-2-propanol as described in Example 9.
[11] A high solids acrylic resin at 75 percent by weight acrylic resin solids in ethyleneglycol monomethylether acetate available as AT-400-CA from Rohm and Haas Company.
[12] A methylated and butylated melamine crosslinking agent available as CYMEL 1130 from American Cyanamid Company.
[13] A composition prepared from 23.75 pbw of nonleafing aluminum flakes, 1.25 pbw of Monarch Blue Pigment from Ciba Geigy Corporation, 25 pbw of an iminated acrylic grinding resin, and 50 pbw of solvent comprising methylamyl ketone, mineral spirits, Naphtholite ®, isobutanol and toluene.
[14] A dispersion of non-leafing aluminum flakes at 65 percent by weight solids in mineral spirits available as Aluminum Paste R167 from Ohio Bronze Powder Company.
[15] A mixture of 55 percent by weight of dinonylnaphthalene disulfonic acid in isobutanol of which 50 mole percent of the acid groups have been neutralized with diisopropanol amine is combined with sufficient isopropanol and water to produce the catalyst composition containing 30.0 percent by weight dinonylnaphthalene disulfonic acid, 7.5 percent by weight diisopropanol amine, and 62.5 percent by weight solvents (52.58 percent isopropanol, 39.27 percent isobutanol, and 8.15 percent water).

Compositions 10A through 10J are reduced to a No. 4 Ford Cup viscosity of 19-22 seconds with methylamyl ketone to provide basecoating compositions 10A through 10J and are spray applied to unprimed steel panels using conventional spraying equipment to provide a dry film thickness of basecoat of about 0.6 to 0.7 mils. The spray viscosity and percent by weight spray solids are as set forth in the following TABLE 2. Next, the basecoating compositions on the steel panels are allowed to flash for 2 minutes at ambient atmospheric conditions. Immediately thereafter, a conventional, clear automotive acrylic topcoating composition (available as DCT-2000 from PPG INDUSTRIES, INC.) is spray applied in two passes to the basecoated steel panels with a one minute flash at ambient atmospheric conditions between passes.

Next, the basecoating and topcoating compositions on the steel panels are cured at 250° F. (121° C.) for 30 minutes. All of the cured films prepared utilizing compositions 10A through 10I exhibited good to excellent metallic pattern control as determined visually compared to the cured film prepared utilizing composition 10J which contained no colloidal silica. Moreover the wet coatings prepared utilizing compositions 10A through 10I exhibit good resistance to sag during the heat curing step while the wet coating prepared utilizing composition 10J exhibits much sagging after application and the heat curing step.

Additionally, the 20° gloss, distinctness of image (DOI), and dry film thickness (DFT) in mils is determined for each of the cured composite coatings and the results are as set forth in the following TABLE 3.

TABLE 2

| Composition | Spray Viscosity (No. 4 Ford Cup) | Percent by Weight Spray Solids |
|---|---|---|
| 10A | 19.5 | 49.3 |
| 10B | 19.5 | 51.3 |
| 10C | 19.3 | 52.2 |
| 10D | 21.3 | 37.6 |
| 10E | 20.6 | 43.9 |
| 10F | 20.6 | 47.7 |
| 10G | 19.6 | 42.9 |
| 10H | 19.7 | 52.4 |
| 10I | 20.8 | 52.2 |
| 10J | 20.3 | 59.1 |

TABLE 3

| Example | 20° Gloss | DOI | DFT (mils) |
|---|---|---|---|
| 10A | 84-88 | 66.2 | 2.15 |
| 10B | 87 | 47.1 | 2.25 |
| 10C | 87-88 | 62.6 | 2.15 |
| 10D | 94-95 | 61.2 | 2.0 |
| 10E | 89 | 60.5 | 2.2 |
| 10F | 68 | 18.5 | 2.05 |
| 10G | 52 | 14.5 | 2.05 |
| 10H | 86-89 | 53.0 | 2.3 |
| 10I | 87 | 43.0 | 2.1 |
| 10J | 40-45 | 9.0 | 1.8-2.4* |

*Exhibits much sag.

EXAMPLE 11

This example illustrates the method of the invention utilizing a high-solids basecoating composition.

A high-solids, metallic basecoating composition is prepared by mixing under agitation the ingredients in the amounts in parts by weight set forth in the following TABLE 4.

TABLE 4

|  | pbw |
|---|---|
| Ultraviolet light absorber[1] | 3.0 |
| Methylamyl ketone | 20.0 |
| Colloidal silica dispersion[2] | 70.3 |
| Acrylic resin[3] | 70.1 |
| Crosslinking agent[4] | 75.0 |
| Methanol | 9.0 |
| Aluminum paste[5] | 31.6 |
| Catalyst composition[6] | 3.8 |

[1] As described in footnote 1 to Table 1.
[2] A dispersion of colloidal silica in dipropyleneglycol monomethylether prepared in the manner described in Example 1 but having a silica solids content of 32.0 percent by weight.
[3] As described in footnote 11 to Table 1.
[4] As described in footnote 12 to Table 1.
[5] As described in footnote 14 to Table 1.
[6] As described in footnote 15 to Table 1.

The metallic basecoating composition is spray applied at a solids content of 57.4 percent by weight and a No. 4 Ford Cup viscosity of 39.6 seconds to an unprimed steel panel to form a basecoat. Next, the basecoat is allowed to flash for 2 minutes at ambient atmospheric conditions. Immediately thereafter, a conventional, clear, automotive acrylic topcoating composition (available as DCT-2000 from PPG INDUSTRIES, INC.) is spray applied in two passes to the basecoat with a one minute flash at ambient atmospheric conditions between passes to form a topcoat.

Next the basecoat and topcoat are cured at 250° F. (121° C.) for 30 minutes to a total dry film thickness of 2.1 mils. The composite coating exhibits excellent resistance to sagging during cure and the resulting cured composite film exhibits excellent metallic pattern control as determined visually (i.e., the cured film exhibits an excellent two tone appearance when viewed at different angles to a direction normal to the surface and excellent metallic brightness when viewed from a direction essentially normal to the surface). Additionally the cured composite film has a 20° gloss of 86 and a definition of image (DOI) of 52.7 at the 2.1 mil dry film thickness.

EXAMPLE 12

This example illustrates the method of the invention wherein the topcoating composition containing colloidal silica is applied to a basecoat which does not contain colloidal silica.

Topcoating composition 12A and topcoating composition 12B (for comparison) are prepared by mixing under agitation the ingredients in the amounts in parts by weight set forth in the following TABLE 5.

TABLE 5

| Composition | 12A | 12B |
|---|---|---|
| Ultraviolet light absorber[1] | 4.0 | 4.0 |
| Methylamyl ketone | 124.0 | 123.0 |
| Colloidal silica dispersion[2] | 18.4 | 0 |
| Acrylic resin[3] | 158.4 | 171.8 |
| Crosslinking agent[4] | 100.2 | 100.2 |

[1] As described in footnote 1 to Table 1.
[2] The dispersion of colloidal silica in dipropyleneglycol monomethylether as described in Example 2.
[3] As described in footnote 11 to Table 1.
[4] A polymeric butylated melamine-formaldehyde resin at about 67 percent by weight solids in a solvent mixture containing 22 percent by weight butanol and 78 percent by weight naphtha and having a naphtha tolerance ranging from 140 to 290.

Next, samples of compositions 12A and 12B are each catalyzed with a phenyl acid phosphate solution and a sulfonic acid solution to form topcoating compositions 12C and 12D respectively, as set forth in the following TABLE 6. The percent by weight spray solids and the spray viscosities for topcoating compositions 12C and 12D are also set forth in TABLE 6.

TABLE 6

|  | Topcoating Composition 12C | Topcoating Composition 12D |
|---|---|---|
| Composition 12A | 202.5 | — |
| Composition 12B | — | 200.0 |
| Phenyl acid phosphate solution[1] | 1.0 | 1.0 |
| Sulfonic acid solution[2] | 0.73 | 0.73 |
| No. 4 Ford Cup Viscosity in seconds | 28.9 | 29.1 |
| Percent by weight spray solids | 49.4 | 50.8 |

[1] Phenyl acid phosphate PA-75 from Mobil Chemical Corp. which is diluted to 50 percent by weight with isopropanol.
[2] Dinonylnaphthalene disulfonic acid available as NACURE 155 from King Industries.

Next, unprimed steel panels are spray coated with a high-solids thermosetting acrylic basecoating composition (available as DCT 15472 from PPG INDUSTRIES, INC.) at a No. 4 Ford Cup viscosity of 19 seconds after dilution with methylamyl ketone to form a basecoat. The basecoat is allowed to flash for 2 minutes at ambient atmospheric conditions after which topcoating compositions 12C and 12D are spray applied to the basecoats to form topcoats. The resulting composite basecoat/topcoat films are cured at 285° F. (141° C.) for 30 minutes. Properties of the resulting cured films are as set forth in the following TABLE 7.

TABLE 7

|  |  | Example 12C | Example 12D |
|---|---|---|---|
| Approximate dry film thickness (mils) | Basecoat | 0.6–0.7 | 0.6–0.7 |
|  | Topcoat | 1.4–1.55 | 1.3–1.4 |
|  | Total | 2.25 | 2.0–2.1 |
| 20° Gloss |  | 87 | 87 |
| Definition of Image (DOI) |  | 60.5 | 55.0 |
| Appearance |  | No sag observed even at panel edges | Sag is apparent at top and bottom edges of panel |

Thus, Example 12C illustrates that the method of the invention can be utilized to control sagging of the high solids, clear topcoat and still provide a composite, cured film having a high degree of gloss.

What is claimed is:

1. A method of coating a substrate comprising the steps of:
   (A) coating a substrate with one or more applications of a basecoating composition comprising:
   (1) an organic film-forming resin, and where the film-forming resin can be crosslinked, optionally a crosslinking agent for the film-forming resin,
   (2) substantially colorless, substantially inorganic microparticles of silica stably dispersed in the basecoating composition, the microparticles of silica prior to incorporation in the basecoating composition ranging in size from about 1 to about 100 nanometers wherein the silica has been incorporated in an alcohol in the form of a stable colloidal dispersion of the silica in the alcohol, and wherein the inorganic microparticles are present in the basecoating composition in an amount ranging from about 1 to about 30 percent by weight based on the weight of organic film-forming resin, optional crosslinking agent, and inorganic microparticles,
   (3) a solvent system for the film-forming resin, and
   (4) pigment particles to form a basecoat; and
   (B) coating the basecoat with one or more applications of a topcoating composition comprising:
   (1) an organic film-forming resin, which may be the same as or different from the film-forming resin of the basecoating composition, and where the film-forming resin of the topcoating composition can be crosslinked, optionally a crosslinking agent for the film-forming resin of the topcoating composition, and
   (2) a solvent system for the organic film-forming resin of the topcoating composition
   to form a transparent topcoat.

2. The method of claim 1 wherein the organic film-forming resin of the basecoating composition comprises a crosslinkable resin having a weight average molecular weight of from about 500 to about 10,000.

3. The method of claim 1 wherein prior to incorporation in the coating composition the substantially inorganic microparticles range in size from about 3.5 to about 50 nanometers.

4. The method of claim 1 wherein the alcohol is selected from a monohydric alcohol, a polyol or a mixture thereof.

5. The method of claim 1 wherein the silica has been treated by heating the silica in the presence of a monohydric alcohol, a polyol, or a mixture thereof at a temperature of at least 180° C.

6. The method of claim 1 wherein the silica has thereon a surface-bonded organic compound formed by reaction of surface silanol moieties of the silica with an organic compound having a functional group reactive with the silanol moiety.

7. The method of claim 6 wherein the organic compound is selected from a monohydric alcohol, a polyol, or a mixture thereof.

8. The method of claim 6 wherein the surface-bonded organic compound is present in an amount sufficient to make the surface of the silica hydrophobic.

9. The method of claim 1 wherein the substantially inorganic microparticles comprise silica prepared from the hydrolysis of a compound selected from the group consisting of a tetraalkylorthosilicate, an alkoxypolysiloxane, an alkylalkoxysilane, and a mixture thereof in the presence of a base in a medium of pH greater than 7.0.

10. The method of claim 9 wherein the compound is a tetraalkylorthosilicate selected from the group consisting of tetramethylorthosilicate, tetraethylorthosilicate, tetrapropylorthosilicate, and a mixture thereof.

11. The method of claim 1 wherein the basecoating composition is applied to the substrate at a total solids content of at least 50 percent by weight of the basecoating composition by conventional spraying.

12. The method of claim 1 wherein the topcoating composition is applied to the substrate at a total solids content of at least 50 percent by weight of the topcoating composition by conventional spraying.

13. The method of claim 1 wherein the basecoating and the topcoating composition are applied by conventional spraying to the substrate at a combined total solids content of at least 50 percent by weight of the sum of the basecoating composition and the topcoating composition.

14. The method of claim 2 wherein the basecoating composition contains a crosslinking agent for the crosslinkable resin.

15. The method of claim 1 wherein at least a portion of the pigment particles are metallic flakes.

16. The method of claim 15 wherein the metallic flakes comprise aluminum flakes.

17. The method of claim 1 wherein the basecoating composition additionally comprises organic polymeric microparticles which are insoluble in the solvent system of the basecoating composition and which have a diameter in the range of from about 0.01 to about 40 microns.

18. The product produced by the method of claim 1.

19. The product produced by the method of claim 11.

20. The product produced by the method of claim 15.

* * * * *